(12) United States Patent
Wakumoto et al.

(10) Patent No.: US 7,609,705 B2
(45) Date of Patent: Oct. 27, 2009

(54) DETERMINATION OF A PLURALITY OF PATHS BEFORE SELECTION OF ONE PATH OF THE PLURALITY OF PATHS FOR TRANSMISSION OF ONE OR MORE PACKETS

(75) Inventors: Shaun Kazuo Wakumoto, Roseville, CA (US); Ballard Claude Bare, Auburn, CA (US); Cetin Ersoy, Portsmouth, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1043 days.

(21) Appl. No.: 10/850,334

(22) Filed: May 20, 2004

(65) Prior Publication Data

US 2005/0259647 A1 Nov. 24, 2005

(51) Int. Cl.
*H04L 12/28* (2006.01)
(52) U.S. Cl. .................. 370/406; 370/248; 379/221.12; 709/231
(58) Field of Classification Search ................. 370/406, 370/218, 248, 395.3, 535; 379/221.12; 709/239
See application file for complete search history.

(56) References Cited

U.S. PATENT DOCUMENTS

| | | | |
|---|---|---|---|
| 5,237,565 A | 8/1993 | Henrion et al. | |
| 5,519,698 A | 5/1996 | Lyles et al. | |
| 5,532,692 A | 7/1996 | Tatsuya | |
| 5,541,914 A | 7/1996 | Krishnamoorthy et al. | |
| 5,586,116 A | 12/1996 | Hofestadt et al. | |
| 5,602,844 A | 2/1997 | Lyles | |
| 6,011,780 A * | 1/2000 | Vaman et al. ............... | 370/237 |
| 6,055,561 A | 4/2000 | Feldman et al. | |
| 6,061,363 A | 5/2000 | Evans et al. | |
| 6,130,889 A | 10/2000 | Feldman et al. | |
| 6,212,628 B1 | 4/2001 | Abercrombie et al. | |
| 6,269,099 B1 | 7/2001 | Borella et al. | |
| 6,301,257 B1 | 10/2001 | Johnson et al. | |
| 6,374,303 B1 | 4/2002 | Armitage et al. | |
| 6,529,958 B1 | 3/2003 | Oba et al. | |
| 6,556,541 B1 | 4/2003 | Bare | |
| 6,577,600 B1 | 6/2003 | Bare | |
| 6,580,715 B1 | 6/2003 | Bare | |
| 6,611,526 B1 | 8/2003 | Chinnaswamy et al. | |
| 6,631,415 B1 | 10/2003 | James et al. | |
| 6,647,017 B1 | 11/2003 | Heiman | |
| 6,667,959 B1 | 12/2003 | Hebb et al. | |
| 6,697,359 B1 | 2/2004 | George | |
| 7,123,620 B1 * | 10/2006 | Ma ........................ | 370/395.32 |
| 7,382,734 B2 * | 6/2008 | Wakumoto et al. .......... | 370/248 |
| 2003/0108069 A1 * | 6/2003 | Yamada .................... | 370/535 |
| 2003/0179707 A1 * | 9/2003 | Bare ......................... | 370/235 |
| 2004/0032831 A1 * | 2/2004 | Matthews ................... | 370/238 |
| 2004/0141463 A1 * | 7/2004 | Acharya et al. ............. | 370/238 |
| 2004/0205239 A1 * | 10/2004 | Doshi et al. ................. | 709/241 |

(Continued)

*Primary Examiner*—Olisa Anwah

(57) ABSTRACT

An apparatus in one example comprises a first mesh network switch, of a plurality of mesh network switches, that employs mesh connection information of one or more mesh network switches of the plurality of mesh network switches to determine a plurality of paths between the first mesh network switch and a second mesh network switch, of the plurality of mesh network switches, before a selection of one path of the plurality of paths for transmission of one or more packets from the first mesh network switch to the second mesh network switch.

31 Claims, 2 Drawing Sheets

U.S. PATENT DOCUMENTS

2004/0218542 A1* 11/2004 Lee .............................. 370/248
2005/0078601 A1* 4/2005 Moll et al. ................... 370/218
2005/0099948 A1* 5/2005 Wakumoto et al. .......... 370/236
2005/0163137 A1* 7/2005 Wakumoto et al. .......... 370/406
2005/0213582 A1* 9/2005 Wakumoto et al. ........ 370/395.3
2005/0220026 A1* 10/2005 Dziong et al. ............... 370/237

* cited by examiner

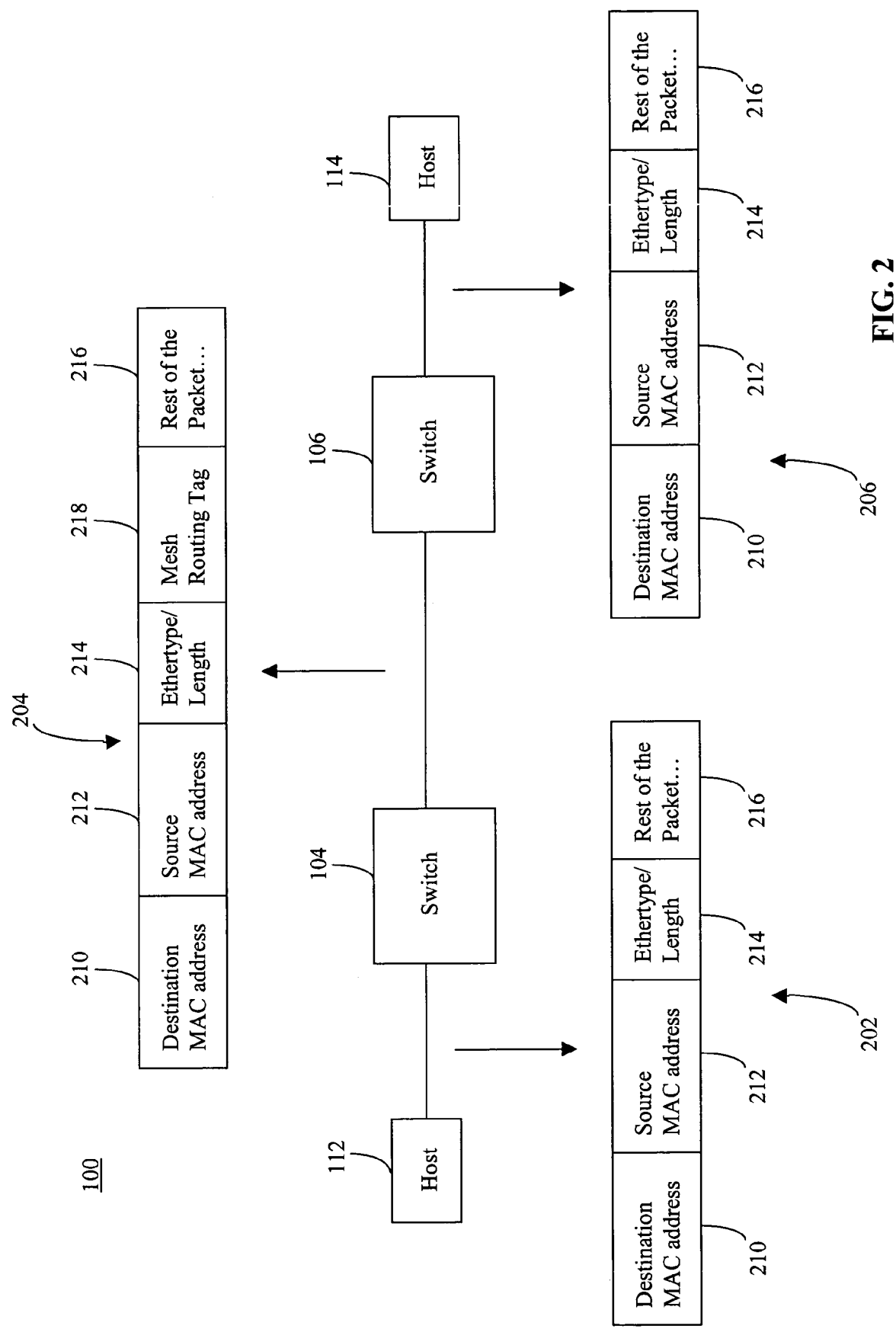

DETERMINATION OF A PLURALITY OF PATHS BEFORE SELECTION OF ONE PATH OF THE PLURALITY OF PATHS FOR TRANSMISSION OF ONE OR MORE PACKETS

CROSS-REFERENCE TO RELATED APPLICATIONS

This application contains subject matter that is related to the subject matter of the following application, which is assigned to the same assignee as this application. The below-listed application is hereby incorporated herein by reference in its entirety:

"DIRECTING A PATH VERIFICATION REQUEST ALONG A SPECIFIC PATH TO A MESH NETWORK SWITCH TO TEST OPERABILITY OF THE SPECIFIC PATH," by Wakumoto, et al., co-filed herewith.

BACKGROUND

Mesh networks comprise a plurality of interconnected mesh network switches. Each of the mesh network switches has one or more available paths to each of the other mesh network switches. A first mesh network switch may send a data packet to any of the other mesh network switches. For example, the data packet may travel along any one of the available paths from the first mesh network switch to a second mesh network switch.

The first and second mesh network switches exchange meshing cost protocol packets to test the available paths between the first and second mesh network switches. The meshing cost protocol packets test the performance of each path, such as the number of hops in the path, link speed of the path, and the like. In one example, the first and second mesh network switches periodically exchange the meshing cost protocol packets to periodically determine the cost of each path. The first and second mesh network switches in one example exchange the meshing cost protocol packets every thirty seconds. In another example, the first network switches and second mesh network switches exchange the meshing cost protocol packets upon a change in the mesh network. After sending the meshing cost protocol packets, the first mesh network switch determines one path of the available paths that has the lowest cost (e.g., highest performance) based on the results of the meshing cost protocol packets. If the first mesh network switch sends a data packet to the second mesh network switch during a specific interval, then the first mesh network switch employs the one path that has the lowest cost during that specific interval.

If the one path that has the lowest cost during that specific interval fails, then the first and second mesh network switches in one example must again exchange meshing cost protocol packets through each of the available paths between the first and second mesh network switches to find a substitute path that has the lowest cost. The first mesh network switch then may send a data packet to the second mesh network switch along the substitute path that now has the lowest cost during that specific interval.

SUMMARY

The invention in one implementation encompasses an apparatus. The apparatus comprises a first mesh network switch, of a plurality of mesh network switches, that employs mesh connection information of one or more mesh network switches of the plurality of mesh network switches to determine a plurality of paths between the first mesh network switch and a second mesh network switch, of the plurality of mesh network switches, before a selection of one path of the plurality of paths for transmission of one or more packets from the first mesh network switch to the second mesh network switch.

Another implementation of the invention encompasses a method. A first path identifier is assigned to a first path of a plurality of paths between a first mesh network switch and a second mesh network switch. A second path identifier is assigned to a second path of the plurality of paths between the first mesh network switch and the second mesh network switch. The first path identifier is employed to direct one or more packets along the first path rather than the second path.

Yet another implementation of the invention encompasses a method. A substitute path of a plurality of predetermined paths to a mesh network switch is selected for transmission of one or more packets to the mesh network switch upon a determination to avoid an intended path of the plurality of predetermined paths for transmission of the one or more packets.

The invention in another implementation comprises an apparatus. The apparatus comprises means for employing mesh connection information of one or more mesh network switches of a plurality of mesh network switches to determine a plurality of paths between a first mesh network switch and a second mesh network switch of the plurality of mesh network switches. The apparatus comprises means for selecting one path of the plurality of paths for transmission of one or more packets from the first mesh network switch to the second mesh network switch.

The invention in yet another implementation comprises an article. The article comprises one or more computer-readable signal-bearing media. The article comprises means in the one or more media for assigning a first path identifier to a first path of a plurality of paths between a first mesh network switch and a second mesh network switch. The article comprises means in the one or more media for assigning a second path identifier to a second path of the plurality of paths between the first mesh network switch and the second mesh network switch. The article comprises means in the one or more media for employing the first path identifier to direct one or more packets along the first path rather than the second path.

DESCRIPTION OF THE DRAWINGS

Features of exemplary implementations of the invention will become apparent from the description, the claims, and the accompanying drawings in which:

FIG. 2 is a representation of a transmission of a packet through a first mesh network switch and a second mesh network switch of the plurality of mesh network switches of the apparatus of FIG. 1.

DETAILED DESCRIPTION

Figure 1:
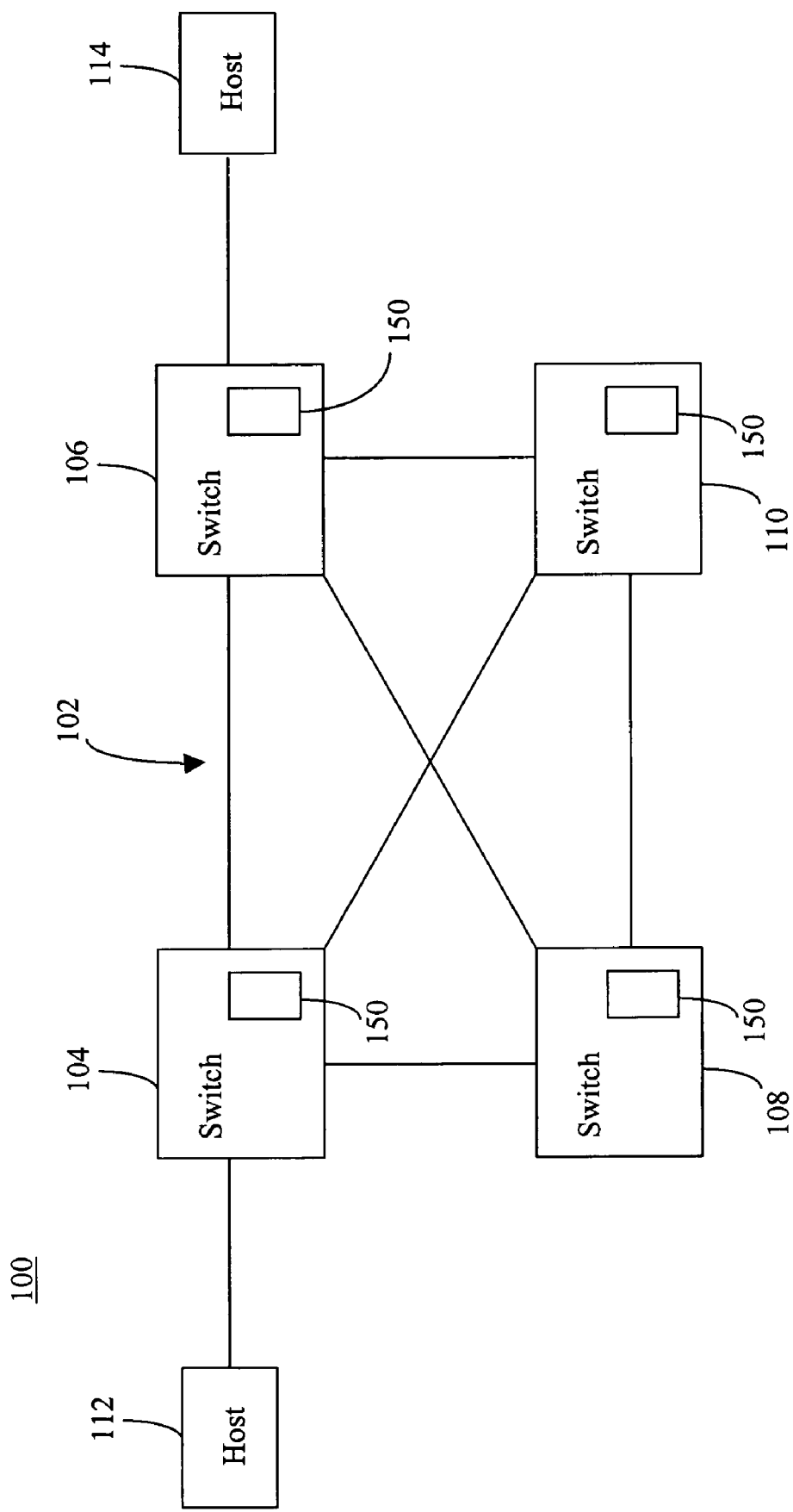
FIG. 1 is a representation of an exemplary implementation of an apparatus that comprises a plurality of mesh network switches.

Referring to the BACKGROUND section above, the first mesh network switch employs the one path that has the lowest cost during the specific interval. As one shortcoming, during the specific interval, the first mesh network switch is unable to send the data packet along a different path to the second mesh network switch. The first mesh network switch in one example only knows which forwarding port to use to send out the data packet to the second mesh network switch. As another shortcoming, the first mesh network switch is unable to determine the entire path that the data packet will take through the mesh network to the second mesh network switch. Upon a failure of the one path, the first and second switches must again exchange meshing cost protocol packets to find the substitute path. As yet another shortcoming, the meshing cost protocol packet negotiation to find the substitute path consumes a relatively large amount of time and processing power. The meshing cost protocol is also very resource intensive in large switch configurations.

Turning to FIG. 1, an apparatus 100 in one example comprises one or more mesh networks 102. The mesh network 102 in one example comprises a plurality of mesh network switches 104, 106, 108, and 110. The mesh network switches 104, 106, 108, and 110 in one example connect a plurality of hosts 102 and 104 that reside outside of the mesh network 102.

Each of the mesh network switches 104, 106, 108, and 110 in one example has one or more available paths to each of the other mesh network switches 104, 106, 108, and 110. The mesh network switch 104 is able send a packet to any of the mesh network switches 106, 108, and 110. The packet in one example comprises a data packet. The packet may to travel along any selected path of the available paths from the mesh network switch 104 to the mesh network switch 106. For example, the mesh network switch 104 specifies a path for the packet to travel along to the mesh network switch 106.

The mesh network switch 104 directs the packet along a specific path to the mesh network switch 106. For example, the mesh network switch 104 inserts a mesh tag associated with the specific path into the packet while the packet is in the mesh network 102. The mesh network switch 104 employs the mesh tag to route the packet along the specific path to the mesh network switch 106. Upon receipt of the packet, the mesh network switch 106 strips off the mesh tag and forwards the packet out of the mesh network 102 on one or more non-mesh ports.

The mesh tag associated with the specific path between the mesh network switch 104 and the mesh network switch 106 comprises a unique identifier of the mesh network switch 104 (e.g., source switch identifier), a unique identifier of the mesh network switch 106 (e.g., destination switch identifier), and a unique identifier of the specific path. The mesh tag may comprise any number of bits to uniquely represent a specific path through the mesh network 102. The mesh tag in one example comprises a 16-bit tag added to a packet to direct the packet along a specific path. For example, the unique identifier of the mesh network switch 104 is a 6-bit field, the unique identifier of the mesh network switch 106 is a 6-bit field, and the unique identifier of the specific path is a 4-bit field. Other exemplary embodiments of the mesh tag employ bit fields of various sizes.

The mesh network switch 104 in one example is assigned the 6-bit unique identifier of 000001. The mesh network switch 106 in one example is assigned the 6-bit unique identifier of 000010. A first path between the mesh network switch 104 and the mesh network switch 106 in one example is assigned the 4-bit unique identifier of 0001. So, the 16-bit mesh tag for the first path between the mesh network switch 104 and the mesh network switch 106 would be 0000010000100001 (i.e., 0x0421). A second path between the mesh network switch 104 and the mesh network switch 106 in one example is assigned the 4-bit unique identifier of 0010. So, the 16-bit mesh tag for the second path between the mesh network switch 104 and the mesh network switch 106 would be 0000010000100010 (i.e., 0x0422).

In one example, to determine the 6-bit unique identifier of the mesh network switches 104, 106, 108, and 110, the mesh network switches 104, 106, 108, and 110 employ a switch identification negotiation protocol. Upon initialization, the mesh network switches 104, 106, 108, and 110 negotiate a 6-bit unique identifier with each of the other mesh network switches 104, 106, 108, and 110. Each of the mesh network switches 104, 106, 108, and 110 in the mesh network 102 in one example have a 6-bit identifier between zero and sixty-three. If a new mesh network switch enters the mesh network 102, the new mesh network switch will negotiate for a 6-bit identifier that is not currently being used by one of the mesh network switches 104, 106, 108, and 110 in the mesh network 102. In another example, the 6-bit identifiers of the mesh network switches 104, 106, 108, and 110 are user-configurable. For example, a user will set a unique 6-bit identifier for each of the 6-bit identifiers.

Once the mesh network switch 104 has negotiated and been assigned a switch identifier, the mesh network switch 104 can start to broadcast mesh connection information packets to the mesh network switches 106, 108, and 110. The mesh connection information packets in one example comprise the switch identifier of the mesh network switch 104, a number of mesh links of the mesh network switch 104, port numbers of the mesh network switch 104, neighbor mesh network switch information, and neighbor mesh network switch port numbers. The mesh network switch 104 informs the mesh network switches 106, 108, and 110 about the mesh connection information of the mesh network switch 104. The mesh network switches 106, 108, and 110 employ the mesh connection information of the mesh network switch 104 as a topology update and may forward the mesh connection information packets out to other mesh network switches. The mesh network switches 106, 108, and 110 can employ the mesh connection information of the mesh network switch 104 to determine paths through the mesh network 102 to the mesh network switches 106, 108, and 110. The mesh network switches 106, 108, and 110 broadcast analogous mesh connection information to the other mesh network switches 104, 106, 108, and 110.

A 4-bit value in one example represents the unique identifier of the specific path. So, the 4-bit value, combined with the source switch identifier and the destination switch identifier, is able to uniquely identify up to sixteen different paths between any two of the mesh network switches 104, 106, 108, and 110 within the mesh network 102. To determine the 4-bit unique identifier of the specific path from the mesh network switch 104 to the mesh network switch 106, the mesh network switch 104 determines a plurality of selected paths from a plurality of available paths between the mesh network switch 104 and the mesh network switch 106. In one example, the plurality of selected paths comprises a subset of the plurality of available paths. In another example, the plurality of selected paths comprises all of the plurality of available paths. The mesh network switches 104, 106, 108, and 110 in one example predetermine a sub-portion of the sixteen unique path identifiers. During operation, the mesh network switches 104, 106, 108, and 110 may find a need to use the remainder of the sixteen unique path identifiers. For example, if one of the predetermined paths fails, then the mesh network switches 104, 106, 108, and 110 quickly determine a new path and assign one of the remaining unique path identifiers to the new path.

The mesh network switch 104 employs mesh connection information of one or more of the mesh network switches 104, 106, 108, and 110 to determine the plurality of selected paths before a selection of one path of the plurality of selected paths for transmission of one or more packets from the mesh network switch 104 to the mesh network switch 106.

The mesh connection information in one example comprises a topology map of the mesh network 102. The mesh network switch 104 stores the connections each of the mesh network switches 104, 106, 108, and 110 has with each of the other mesh network switches 104, 106, 108, and 110. For example, the mesh network switch 104 knows of a first port connection with the mesh network switch 106, a second port connection with the mesh network switch 108, and a third port connection with the mesh network switch 110. The mesh network switch 104 also knows that the mesh network switch 108 has a first port connection with the mesh network switch 104, a second port connection with the mesh network switch 106, and a third port connection with the mesh network switch 110. The mesh network switch 104 also knows the mesh connection information of the mesh network switch 106 and 110. So, the mesh network switch 104 is able to determine and set-up a plurality of paths to each of the mesh network switches 106, 108, and 110. For example, the mesh network switch 104 sets a unique 4-bit path identifier for each of the plurality of paths to each of the mesh network switches 106, 108, and 110.

The mesh network switch 104 may store the unique 4-bit path identifier for each of the plurality of paths in a list and/or database of path identifiers. To send a packet to the mesh network switch 106, the mesh network switch 104 selects, from the list, one of the 4-bit identifiers associated with a specific path between the mesh network switch 104 and the mesh network switch 106.

The mesh network switch 104 may organize the list based on one or more criteria. For example, the mesh network switch 104 may rank the plurality of paths between the mesh network switch 104 and the mesh network switch 106 based on one or more performance or latency characteristics, such as number of hops, port queue depths, link speed, and/or port packet drop rate. In another example, the list may be user-configurable. A user may specify the ranking of the plurality of paths. The mesh network switch 104 may reserve low latency paths for time sensitive packets, such as voice or video traffic. The mesh network switch 104 may also reserve higher latency paths for lower priority traffic. The mesh network switch 104 periodically tests the plurality of available paths between the mesh network switch 104 and the mesh network switch 106 to determine whether the plurality of selected paths are preferred over unused paths of the plurality of available paths. The mesh network switch 104 may reorganize the list if necessary. For example, if some paths are getting over used, the mesh network switches 104, 106, 108, and 110 could use another mesh tag associated with another predetermined path to carry packets.

When one of the mesh network switches 104, 106, 108, and 110 learns of a path to another of the mesh network switches 104, 106, 108, and 110, one of the mesh network switches 104, 106, 108, and 110 then forms the path to the other of the mesh network switches 104, 106, 108, and 110 using a path generation packet. For example, the mesh network switch 104 assigns a unique mesh tag to the path to the mesh network switch 106. The mesh network switch 104 sends the path generation packet along the path through any hop switches to the mesh network switch 106 to inform the hop switches and the mesh network switch 106 of the path. Hop switches comprise any switches between the source switch and destination switch in the mesh network 102. For example, a hop switch is an intermediary along a given path through the mesh network 102.

The 4-bit path identifier of the mesh tag allows each switch of the mesh network switches 104, 106, 108, and 110 to predetermine up to sixteen redundant unicast paths to each of the other mesh network switches 104, 106, 108, and 110. Each switch in one example fills twelve or less of the sixteen redundant unicast paths. So, upon a failure of one or more of the redundant unicast paths, the mesh network switches 104, 106, 108, and 110 can employ one or more of the remaining unassigned unique path identifiers to determine and save new paths.

Upon receipt of the path generation packet at a receiving switch of the mesh network switches 104, 106, 108, and 110, the receiving switch sends an acknowledgement packet back to a hop switch of the mesh network switches 104, 106, 108, and 110 that forwarded the path generation packet. The receiving switch stores the path information in software tables and programs the mesh tag and forwarding port in hardware of the receiving switch.

If the hop switch does not receive the acknowledgement packet, then the hop switch informs a source switch of the mesh network switches 104, 106, 108, and 110 that the path is no longer valid. For example, the hop switch sends a path invalid packet to the source switch. The source switch will invalidate the specific mesh tag and send out a path removal packet along the path. The mesh network switches 104, 106, 108, and 110 create redundant paths that are somewhat different from one another between the other mesh network switches 104, 106, 108, and 110. So, a single link failure is unlikely to invalidate many of the redundant paths.

Each of the mesh network switches 104, 106, 108, and 110 in one example may store up to 16 (e.g., based on a 4-bit path identifier) broadcast paths to the other mesh network switches 104, 106, 108, and 110. For example, if the destination switch identifier of the mesh tag is set to zero, then the mesh tag represents a broadcast path for the switch of the mesh network switches 104, 106, 108, and 110 associated with the source switch identifier. The broadcast path comprises a set of paths from the source switch of the mesh network switches 104, 106, 108, and 110 to all the other mesh network switches 104, 106, 108, and 110.

The mesh network switches 104, 106, 108, and 110 determine a plurality of redundant broadcast paths. For example, each of the mesh network switches 104, 106, 108, and 110 pre-builds a plurality of broadcast paths to the other mesh network switches 104, 106, 108, and 110. Upon failure of one of the plurality of broadcast paths, the mesh network switches 104, 106, 108, and 110 may use a different mesh tag associated with a different broadcast path of the plurality of broadcast paths. The mesh network switches 104, 106, 108, and 110 generate the plurality of broadcast paths analogously to the plurality of unicast paths.

The mesh network switches 104, 106, 108, and 110 predetermine a plurality of redundant paths between other mesh network switches 104, 106, 108, and 110. For example, the mesh network switch 104 predetermines a plurality of redundant paths to the mesh network switch 106. The mesh network switch 104 stores a list of the plurality of unique mesh tags associated with the plurality of redundant paths. The mesh network switch 104 in one example employs a first path of the plurality of redundant paths to send one or more first packets to the mesh network switch 106. Upon a determination to not use the first path for one or more other packets, the mesh network switch 104 selects a second path of the plurality of redundant paths for transmission of the other packets to the mesh network switch 106. For example, upon failure of a link in the first path, the mesh network switch 104 inserts a mesh tag associated with the second path into the other packets to route the other packets along the second path. In one example, the other packets are the one or more first packets with the mesh tag of the second path substituted for the mesh tag of the first path. In another example, the other packets have different data payloads than the one or more first packets. The mesh network switch of the mesh network switches 104, 106, 108, and 110 that determines the failure of the link in the first path, inserts the mesh tag associated with the second path into the other packets and propagates the other packets to the mesh network switch 106.

Upon determination that a path has failed, one or more of the mesh network switches 104, 106, 108, and 110 send out topology update packets. The topology update packets indicate which paths have failed and/or which paths are still valid. For example, upon the determination by the mesh network switch 104 that the link in the path has failed, the mesh network switch 104 sends updated mesh connection information to the other mesh network switches 106, 108, and 110 to indicate failure of the link.

The mesh network switches 104, 106, 108, and 110 employ the received topology update packets to update stored topology information and can recognize which paths are now invalid. The mesh network switches 104, 106, 108, and 110 in one example store a list of the plurality of redundant paths. Upon a determination that a link in a path has failed, the mesh network switches 104, 106, 108, and 110 in one example associate a flag with any path on the list that runs through the link. To transmit a packet to the mesh network switch 106, the mesh network switch 104 searches the list for a second path that is not associated with the flag. In another example, the mesh network switches 104, 106, 108, and 110 may re-tag the path to avoid the failed link. For example, the mesh network switches 104, 106, 108, and 110 may alter the path and the associated mesh tag to avoid the failed link.

Upon the determination that the first path has failed, one or more of the mesh network switches 104, 106, 108, and 110 send path removal packets to the other mesh network switches 104, 106, 108, and 110. The mesh network switches 104, 106, 108, and 110 in one example wait for five to ten seconds to send the path removal packets to prevent delayed packets from erroneously indicating failure of the first path. The path removal packets in one example indicate to the mesh network switches 104, 106, 108, and 110 to delete the mesh tag associated with the first path from the list of predetermined paths.

Packets may be assigned to paths based on one or more characteristics of the source, destination, or packet type. The mesh network switches 104, 106, 108, and 110 in one example had at first assigned one or more destination and/or source Media Access Control ("MAC") addresses to the path. For example, the packet may be assigned to a path based on the destination MAC address, source MAC address, or the combination of the destination and source MAC addresses of the packet. Upon failure of the path, the mesh network switches 104, 106, 108, and 110 re-assign one or more of the destination and/or source MAC addresses to a second path of the plurality of predetermined redundant paths.

Referring to FIG. 2, an illustrative description of one exemplary operation of the apparatus 100 is now presented, for explanatory purposes. The host 112 in one example sends a packet 202 into the mesh network 102 for delivery to the host 114. For example, the host 112 sends the packet 202 to the mesh network switch 104. The packet 202 comprises a destination Media Access Control ("MAC") address field 210, a source MAC address field 212, an Ethernet type and/or length ("Ethertype/length") field 214, and the rest of the packet 216.

The destination MAC address field 210 in one example carries the MAC address of the host 114. The source MAC address field 212 in one example carries the MAC address of the host 112. The Ethernet type and/or length ("Ethertype/length") field 214 carries Ethernet format information and/or packet length information. The rest of the packet 216 in one example carries additional header information and/or a data payload of the packet 202.

Upon receipt of the packet 202, the mesh network switch 104 inserts a mesh tag 218 into the packet 202 to create the packet 204. The mesh network switch 104 inserts the mesh tag 218 into the packet 202 at a position where the other mesh network switches 106, 108, and 110 can easily find the mesh tag 218. The mesh tag 218 comprises a unique identifier of the mesh network switch 104 (e.g., source switch identifier), a unique identifier of the mesh network switch 106 (e.g., destination switch identifier), and a unique identifier of a path between the mesh network switch 104 and the mesh network switch 106. The mesh network switch 104 employs the unique identifier of the path to direct the packet 204 along a specific path through the mesh network 102 to the mesh network switch 106. The mesh network switch 104 selects the specific path from a list of a plurality of predetermined paths between the mesh network switch 104 and the mesh network switch 106.

The mesh network 102 looks at the unique identifier of the path to propagate the packet 204 to the mesh network switch 106. For example, if the path runs through one or more hop switches, such as the mesh network switch 108 (FIG. 1), then the hop switches check the unique identifier of the path from the mesh tag 218. The hop switches store a list of any of the unique identifiers of paths that run through the hop switches. For example, the hop switches store a list of the mesh tags associated with the plurality of predetermined paths between the mesh network switch 104 and the mesh network switch 106. So, the hop switches know how to propagate the packet 204 along the path based on the unique identifier of the path.

Upon receipt of the packet 204, the mesh network switch 106 removes the mesh tag 218 from the packet 204 to create the packet 206. The mesh network switch 106 then propagates the packet 206 to the MAC address located in the destination MAC address field 210. For example, the mesh network switch 106 sends the packet 206 to the host 114. The packet 206 is substantially similar to the packet 202. The packet 206 in one example is identical to the packet 202.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. An exemplary computer-readable signal-bearing medium for the apparatus 100 comprises the recordable data storage medium 150 of the mesh network switches 104, 106, 108, and 110. For example, the computer-readable signal-bearing medium for the apparatus 100 comprises one or more of a magnetic, electrical, optical, biological, and atomic data storage medium. In one example, the computer-readable signal-bearing medium comprises a modulated carrier signal transmitted over a network comprising or coupled with the apparatus 100, for instance, one or more of a telephone network, a local area network ("LAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
a first mesh network switch, of a plurality of mesh network switches, that:
employs mesh connection information of one or more mesh network switches of the plurality of mesh network switches to determine a plurality of paths between the first mesh network switch and a second mesh network switch, of the plurality of mesh network switches, before a selection of one path of the plurality of paths for transmission of one or more packets from the first mesh network switch to the second mesh network switch;
assigns a unique first path identifier to a first path of the plurality of paths between the first mesh network switch and the second mesh network switch;
inserts one or more mesh tags comprising the first path identifier in the one or more packets; and
employs the one or more mesh tags to direct the one or more packets along the first path,
wherein the plurality of paths between the first mesh network switch and the second mesh network switch comprise a subset of a plurality available paths between the first mesh network switch and the second mesh network switch,
wherein the plurality of paths between the first mesh network switch and the second mesh network comprises a plurality of selected paths of the plurality available paths,
and wherein the first mesh network switch periodically tests the plurality of available paths between the first mesh network switch and the second mesh network switch to determine whether the plurality of selected paths are preferred over unused paths of the plurality of available paths.

2. The apparatus of claim 1, wherein the plurality of paths comprises a plurality of predetermined redundant unicast paths between the first mesh network switch and the second mesh network switch.

3. The apparatus of claim 1,
wherein the one or more packets comprise a packet,
wherein the first mesh network switch inserts a mesh tag into the packet,
wherein the mesh tag comprises an identifier of the one path of the plurality of paths to route the packet from the first mesh network switch along the one path to the second mesh network switch.

4. The apparatus of claim 3, wherein the mesh tag comprises a unique identifier of the first mesh network switch, a unique identifier of the second mesh network switch, and the identifier of the one path.

5. The apparatus of claim 3, in combination with the second mesh network switch, wherein the second mesh network switch removes the mesh tag from the packet before sending the packet out of a mesh network that comprises the plurality of mesh network switches.

6. The apparatus of claim 1,
wherein the one path comprises a first path,
wherein the one or more packets comprises one or more first packets;
wherein upon a determination to not use the first path for one or more second packets, the first mesh network switch selects a second path of the plurality of paths for transmission of the one or more second packets to the second mesh network switch.

7. The apparatus of claim 6, wherein the first mesh network switch determines and assigns an identifier to the second path before the determination to not use the first path.

8. The apparatus of claim 6, wherein upon failure of a link in the first path, the first mesh network switch selects the second path for transmission of the second packet to the second mesh network switch.

9. The apparatus of claim 6,
wherein the one or more first packets comprise a first packet,
wherein the first mesh network switch inserts a first mesh tag into the first packet,
wherein the first mesh tag comprises an identifier of the first path of the plurality of paths to route the first packet along the first path to the second mesh network switch;
wherein the one or more second packets comprise a second packet,
wherein the second mesh network switch inserts a second mesh tag into the second packet,
wherein the second mesh tag comprises an identifier of the second path of the plurality of paths to route the second packet along the second path to the second mesh network switch.

10. The apparatus of claim 1, wherein the first mesh network switch assigns a unique path identifier to each of the plurality of paths between the first mesh network switch and the second mesh network switch.

11. The apparatus of claim 1, wherein the first mesh network switch stores a unique mesh tag for each of the plurality of paths between the first mesh network switch and a second mesh network switch.

12. The apparatus of claim 1,
wherein the first mesh network switch employs the mesh connection information to determine a plurality of paths to each of the plurality of mesh network switches;
wherein the first mesh network switch stores one unique mesh tag for each of the plurality of paths to the plurality of mesh network switches.

13. The apparatus of claim 1,
wherein the first mesh network switch stores a list of the plurality of paths,
wherein upon a determination that a link in the one path has failed, the first mesh network switch checks the list for a second path that does not run through the link;
wherein the first mesh network switch selects the second path for transmission of one or more second packets from the first mesh network switch to the second mesh network switch.

14. The apparatus of claim 1,
wherein the first mesh network switch stores a list of the plurality of paths,
wherein upon a determination that a link in the one path has failed, the first mesh network switch associates a flag with any path on the list that run through the link.

15. The apparatus of claim 14, wherein upon the determination that the link in the one path has failed, the first mesh network switch searches the list for a second path that is not associated with the flag.

16. The apparatus of claim 1, wherein upon the determination by the first mesh network switch that the link in the one path has failed, the first mesh network switch sends updated mesh connection information to one or more other mesh network switches of the plurality of mesh network switches to indicate failure of the link.

17. The apparatus of claim 1, wherein the first mesh network switch assigns one or more destination and/or source Media Access Control ("MAC") addresses to the one path.

18. The apparatus of claim 17,
wherein the first mesh network switch predetermines the plurality of paths;
wherein upon failure of the one path, the first mesh network switch assigns one or more of the one or more destination and/or source MAC addresses to a second path of the plurality of paths.

19. The apparatus of claim 1, wherein the first mesh network switch employs mesh connection information of the plurality of mesh network switches to determine a plurality of redundant broadcast paths between the first mesh network switch and each of the plurality of mesh network switches.

20. A method, comprising the steps of:
assigning a unique first path identifier to a first path of a plurality of paths between a first mesh network switch and a second mesh network switch;
assigning a unique second path identifier to a second path of the plurality of paths between the first mesh network switch and the second mesh network switch;
inserting one or more mesh tags comprising the first path identifier in one or more packets;
employing said one or more mesh tags to direct the one or more packets along the first path rather than the second path;
selecting the plurality of paths from a plurality of available paths between the first mesh network switch and the second mesh network switch based on one or more performance characteristics of the plurality of paths; and,
testing the plurality of available paths to determine whether the plurality of paths are preferred over unused paths of the plurality of available paths.

21. The method of claim 20, wherein the one or more packets comprise one or more first packets, the method further comprising the step of:
employing, upon a determination to avoid the first path for one or more second packets, the unique path identifier of the second path to direct the one or more second packets along the second path between the first mesh network switch and the second mesh network switch.

22. The method of claim 20, wherein the one or more packets comprise one or more first packets, the method further comprising the steps of:
storing a list of the plurality of paths;
searching, upon a determination that a link in the first path has failed, the list for the second path that does not run through the link; and
employing the second path identifier to direct one or more second packets along the second path rather than the first path.

23. The method of claim 20,
wherein the one or more mesh tags comprise a unique identifier of the first mesh network switch, a unique identifier of the second mesh network switch, and the first path identifier.

24. A method, comprising the steps of:
selecting a substitute path of a plurality of predetermined paths from a first mesh network switch to a second mesh network switch for transmission of one or more packets to the second mesh network switch upon a determination to avoid an intended path of the plurality of predetermined paths for transmission of the one or more packets by employing inserted unique path identifiers assigned to paths between the first mesh network switch and the second mesh network switch to direct the one or more packets;
selecting the plurality of predetermined paths from a plurality of available paths between the first mesh network switch and the second mesh network switch based on one or more performance characteristics of the plurality of paths; and,
testing the plurality of available paths to determine whether the plurality of paths are preferred over unused paths of the plurality of available paths.

25. The method of claim 24,
wherein the one or more packets comprise one or more second packets,
wherein the step of selecting the substitute path of the plurality of predetermined paths to the second mesh network switch for transmission of the one or more packets to the second mesh network switch upon the determination to avoid the intended path of the plurality of predetermined paths for transmission of the one or more packets comprises the steps of:
selecting the intended path of the plurality of predetermined paths for transmission of one or more first packets to the second mesh network switch; and
selecting, upon failure of a link in the intended path, the substitute path for transmission of the one or more second packets to the second mesh network switch.

26. The method of claim 25, wherein the step of selecting, upon failure of the link in the intended path, the substitute path for transmission of the one or more second packets to the second mesh network switch comprises the steps of:
searching a database that stores the plurality of predetermined paths for the substitute path that avoids the link; and
inserting a path identifier of the substitute path into the one or more second packets to direct the one or more second packets along the substitute path.

27. The method of claim 25, further comprising the step of:
sending an indication of the failure of the link in the intended path to one or more mesh network switches to update mesh connection information stored by the one or more mesh network switches.

28. The method of claim 24, further comprising the step of:
reassigning one or more destination and/or source MAC addresses from use of the intended path to use of the substitute path upon failure of the intended path.

29. An apparatus, comprising:
means for employing mesh connection information of one or more mesh network switches of a plurality of mesh network switches to determine a plurality of paths between a first mesh network switch and a second mesh network switch of the plurality of mesh network switches;
means for selecting one path of the plurality of paths for transmission of one or more packets from the first mesh network switch to the second mesh network switch;
means for assigning a plurality of unique identifiers to the plurality of paths between the first mesh network switch and the second mesh network switch; and means for inserting the identifier of the one path of the plurality of identifiers of the plurality of paths into the one or more packets to direct the one or more packets along the one path from the first mesh network switch to the second mesh network switch, wherein the plurality of paths between the first mesh network switch and the second mesh network switch comprise a subset of a plurality available paths between the first mesh network switch and the second mesh network switch, wherein the plurality of paths between the first mesh network switch and the second mesh network comprises a plurality of selected paths of the plurality available paths, and wherein the first mesh network switch periodically tests the plurality of available paths between the first mesh network switch and the second mesh network switch to determine whether the plurality of selected paths are preferred over unused paths of the plurality of available paths.

30. The apparatus of claim 29, wherein the one path comprises a first path, wherein the one or more packets comprise one or more first packets, the apparatus further comprising:

means for storing a list of the plurality of paths between the first mesh network switch and the second mesh network switch; and means for selecting a second path of the plurality of paths from the list for transmission of one or more second packets to the second mesh network switch upon a determination to avoid the first path for the one or more second packets.

31. A network switch, comprising:

means for assigning a first path identifier to a first path of a plurality of paths between a first mesh network switch and a second mesh network switch;

means for assigning a second path identifier to a second path of the plurality of paths between the first mesh network switch and the second mesh network switch;

means for inserting one or more mesh tags comprising the first path identifier in one or more packets; and means for employing said one or more mesh tags to direct the one or more packets along the first path rather than the second path, wherein the plurality of paths between the first mesh network switch and the second mesh network switch comprise a subset of a plurality available paths between the first mesh network switch and the second mesh network switch, wherein the plurality of paths between the first mesh network switch and the second mesh network comprises a plurality of selected paths of the plurality available paths, and wherein the first mesh network switch periodically tests the plurality of available paths between the first mesh network switch and the second mesh network switch to determine whether the plurality of selected paths are preferred over unused paths of the plurality of available paths.

* * * * *